July 26, 1932.  C. J. MARCHANT  1,869,106
ROTARY ENGINE
Filed June 12, 1931

Inventor
C. J. Marchant

Patented July 26, 1932

1,869,106

UNITED STATES PATENT OFFICE

CHARLES J. MARCHANT, OF SOUTH MILWAUKEE, WISCONSIN

ROTARY ENGINE

Application filed June 12, 1931. Serial No. 543,862.

This invention relates to an improved rotary engine.

One of the objects of the present invention is the provision of a rotary engine adapted to be operated by steam or other fluids, and is so constructed and arranged as to provide for a maximum amount of power obtainable with a minimum amount of fluid pressure used.

Another object of the present invention is the provision of a rotary engine of the above type which is provided with spaced inlets diverging at their inner ends to direct the fluid toward the center of the main cylinder and distribute the same so that the power of the fluid will be equalized during its use, and within the cylinder a rotor is provided having ribs and projections thereon to create a zig-zag course for the expansion of the fluid, causing the fluid to travel a maximum distance, so as to utilize the full amount of power from the fluid pressure.

A still further object of the present invention is the provision of a rotary engine including a main housing, the ends of which are closed by means of bearing heads, and within the housing there is supported a cylinder having supporting heads at the ends thereof which cooperate with the bearing heads to properly center the cylinder within the housing, and each bearing head is provided with spaced openings converging at their inner ends, whereby the inlet and exhaust can each travel in opposite directions, thus obtaining the maximum of power from the fluid pressure and providing for an easy exhaust of the used fluid.

With the above and other objects in view, the invention consists in the novel features of construction, the combination and arrangement of parts hereinafter more fully set forth, pointed out in the claims and shown in the accompanying drawing wherein:

Figure 1:
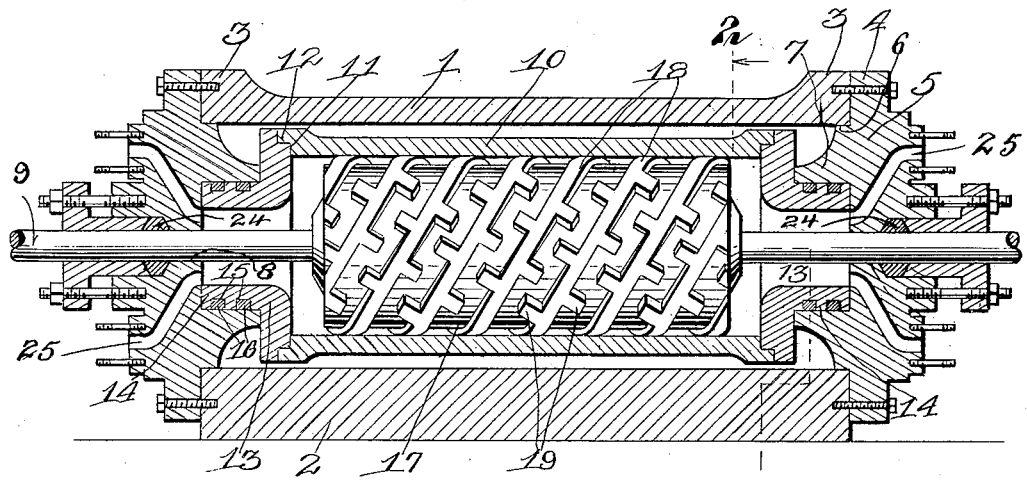
Figure 1 is a longitudinal sectional view taken through my improved rotary engine.
Figure 2:
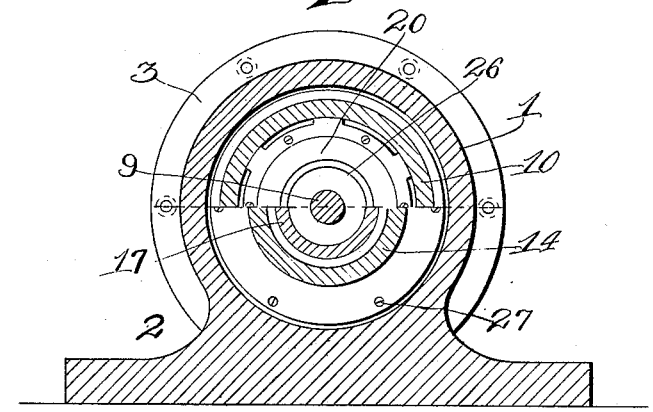
Figure 2 is a sectional view on the line 2—2 of Figure 1.

Referring more particularly to the drawing, 1 indicates the main housing having a suitable base 2 formed integral therewith. As illustrated, the interior of the housing is cylindrical and the ends thereof are provided with outstanding flanges 3 against which the flanges 4 of the bearing heads 5 abut.

Bolts or other fastening members may be passed through these flanges for retaining the bearing heads 5 in position relative to the housing.

Each bearing head is provided with an annular shoulder 6 which fits against the interior of the housing 1 at each end so as to form a substantially fluid-tight connection. Each bearing head is also formed with an inner sleeve bearing 7 and each head 5 is also formed with a central opening 8 to receive the drive shaft 9, as illustrated.

Arranged within the housing 1 is a cylinder 10 formed at each end with a shoulder 11 and with an annular flange portion 12. Supporting heads 13 are provided and these heads are cut away on the inner face to correspond to the shoulders 11 and flanges 12, so that the heads will fit snugly against the ends of the cylinder, as shown in Figure 1. The supporting heads 13 are also provided with laterally extending sleeves 14 which fit within the bearing sleeves 7 on the bearing heads. The sleeves 14 are provided with annular grooves 15 in which are arranged the packing rings 16. Arranged within the cylinder 10 is a rotor 17, provided with a spiral rib 18. This rib 18 has formed on opposite sides thereof alternately arranged lateral projections 19. Therefore, the spiral rib has alternate projections arranged between each spiral to create a zig-zag course for the fluid as it passes through the cylinder.

It will be apparent that the outer faces of the spirals of the rib 18 have a close fitting engagement with the interior of the cylinder 10 so as to retain the fluid within the spiral passageway between each spiral of the rib. Thus, the fluid will be guided in a zig-zag course due to the lateral projections 19.

Figure 3:
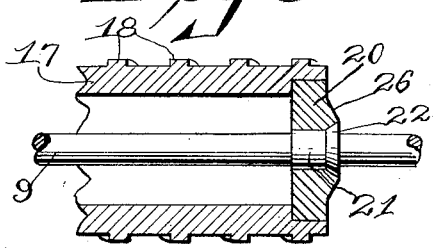
Figure 3 is a detailed longitudinal sectional view of the rotor.

The rotor 17 is preferably hollow, as shown in Figure 3, and the ends thereof are closed by means of the heads 20.

The shaft 9 extends through the rotor, as shown in Figure 3, and where the shaft extends through the heads 20, it is provided with annular enlarged portions 21 adapted to fit snugly within a central opening in each head and the shaft and the heads 20 are retained in position by providing the annular raised portion 22 on the shaft which may be done by swaging or any other similar operation which will provide an annular rib on the shaft for engagement with the heads 20. The shaft 9 is mounted in each bearing head 5 by means of suitable stuffing boxes 24, whereby the shaft may be properly lubricated whenever desired.

It will be noted that where the shaft 9 passes through the sleeves 14, it is spaced a considerable distance from the sleeves to provide for the passage of fluid inwardly into the cylinder 10. Each bearing head is provided with spaced openings 25 which lead inwardly to the outer end of the sleeves 14, thus these openings 25 converge toward their inner ends, and as each bearing head is provided with the spaced openings 25, it will be apparent that conduits can be connected to these openings and steam or other fluid admitted at one end of the cylinder 10 and exhausted at the other end.

Due to the fact that the openings 25 converge at their inner ends, the fluid will be directed toward the center of the rotor 17 at the end the fluid is admitted.

However, in order to direct the fluid outwardly so it will enter the zig-zag passage between the spiral ribs 18, each head 20 is provided with a central rounded raised portion 26 and the rounded walls of these raised portions will have a tendency to direct the fluid outwardly as it enters the cylinder 10, so that the fluid will be equally guided into the zig-zag passages between the ribs 18.

It will be apparent from the foregoing that a rotary engine constructed in accordance with the above will provide a comparatively strong engine, and the maximum amount of power will be obtained in accordance with the amount of fluid used. The shaft 9 which is the drive shaft for the rotor is also mounted so that the rotor will not become distorted; and another feature is the fact that the inlet for the fluid is directed toward the center of the cylinder and then evenly distributed between the ribs 18. The exhaust which occurs at the opposite end of the cylinder is also equalized within one of the sleeves 14 and is directed in a divergent course out through the passages 25 at the opposite end of the cylinder from the inlet.

A rotary engine constructed in accordance with the above will provide a very substantial engine and one which can be driven at a high rate of speed without any of the parts becoming displaced due to the fact that comparatively heavy bolts are passed through the flanges 3 and 4 which not only holds the bearing heads tightly against the ends of the housing, but also engages the supporting heads 13 to retain them in position, although the supporting heads 13 can be retained in position by screw members illustrated at 27.

The device is comparatively simple, and it is believed that the same will do the same work as a comparatively expensive engine of a similar type.

While I have shown and described the preferred embodiment of my invention, it will be apparent from the foregoing that slight changes may be made in the construction when putting the invention into practice without departing from the spirit of the same or the scope of the appended claims.

I claim:

1. A rotary engine including a housing, bearing heads at each end thereof, a cylinder in the housing, supporting heads therefor, having rotative engagement with the bearing heads, a shaft passing through the supporting heads and the cylinder, a rotor mounted upon the shaft, rounded end portions carried by the rotor to guide the fluid outwardly in the cylinder, spiral ribs on the rotor having lateral projections and said bearing heads each having spaced openings converging at their inner ends toward the center of the cylinder.

2. A rotary engine including a housing, bearing heads at each end thereof, inwardly extending sleeves carried by said bearing heads, a cylinder in the housing, supporting heads therefor, laterally extending sleeves on the supporting heads adapted to have rotative engagement with the sleeves on the bearing heads, the sleeves on the supporting heads having annular grooves, packing rings arranged within said grooves, a rotor arranged within the cylinder, and means whereby to direct fluid under pressure through the sleeves toward the center of the rotor.

3. A rotary engine including a housing, bearing heads at each end thereof, inwardly extending sleeves carried by said bearing heads, a cylinder in the housing, supporting heads therefor, laterally extending sleeves on the supporting heads adapted to have rotative engagement with the sleeves on the bearing heads, the sleeves on the supporting heads having annular grooves, packing rings arranged within said grooves, a rotor arranged within the cylinder, means whereby to direct fluid under pressure through the sleeves toward the center of the rotor, a shaft extending through the bearing heads and through the rotor, head members for the rotor fixed to the shaft, rounded portions on said head members for guiding the fluid pressure outwardly of the center of the rotor, and spaced spiral ribs around the outer surface of the rotor having oppositely directed spaced lateral projections to provide a zigzag course for the fluid around the rotor.

In testimony that I claim the foregoing I have hereunto set my hand at Milwaukee, in the county of Milwaukee and State of Wisconsin.

CHARLES J. MARCHANT.